US012703432B2

(12) United States Patent
An et al.

(10) Patent No.: US 12,703,432 B2
(45) Date of Patent: Aug. 11, 2026

(54) VEHICLE BODY STRUCTURE

(71) Applicants: Hyundai Motor Company, Seoul (KR); Kia Corporation, Seoul (KR)

(72) Inventors: Yong Dok An, Anyang-si (KR); Jong Gwan Yun, Geumjeong-gu (KR); Heedae Oh, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 599 days.

(21) Appl. No.: 18/198,072

(22) Filed: May 16, 2023

(65) Prior Publication Data

US 2024/0059358 A1 Feb. 22, 2024

(30) Foreign Application Priority Data

Aug. 16, 2022 (KR) .......................... 1020220101957

(51) Int. Cl.

*B62D 25/08* (2006.01)
*B62D 21/15* (2006.01)
*B62D 24/02* (2006.01)
*B62D 25/02* (2006.01)
*B62D 25/04* (2006.01)
*B62D 29/00* (2006.01)

(52) U.S. Cl.

CPC ........... *B62D 25/08* (2013.01); *B62D 21/152* (2013.01); *B62D 24/02* (2013.01); *B62D 25/025* (2013.01); *B62D 25/04* (2013.01); *B62D 29/001* (2013.01)

(58) Field of Classification Search

CPC ...... B62D 25/08; B62D 25/025; B62D 25/04; B62D 21/152; B62D 29/001

USPC ..................................................... 296/193.01

See application file for complete search history.

(56) References Cited

U.S. PATENT DOCUMENTS

| | | | | |
|---|---|---|---|---|
| 4,533,172 A * | 8/1985 | Oliver | B62D 21/12 | 296/193.03 |
| 4,676,545 A * | 6/1987 | Bonfilio | B62D 29/041 | 440/90 |
| 5,470,125 A * | 11/1995 | Yamazaki | B60J 5/0431 | 49/503 |
| 5,599,057 A * | 2/1997 | Hirahara | B62D 21/15 | 296/187.12 |
| 5,882,064 A * | 3/1999 | Emmons | B62D 23/00 | 296/193.04 |
| 6,942,281 B2 * | 9/2005 | Omori | B60J 5/0448 | 296/187.1 |
| 8,042,860 B2 * | 10/2011 | Takahashi | B60J 5/0437 | 296/146.6 |
| 9,216,768 B1 * | 12/2015 | Dressel | B62D 21/155 | |
| 2005/0116505 A1 * | 6/2005 | Carcioffi | B62D 21/152 | 296/187.03 |

(Continued)

FOREIGN PATENT DOCUMENTS

| | | | |
|---|---|---|---|
| CN | 108100043 B * | 11/2021 | B62D 29/008 |
| CN | 119190206 A * | 12/2024 | B60R 19/023 |

(Continued)

*Primary Examiner* — Hilary L Gutman

(74) *Attorney, Agent, or Firm* — Fish & Richardson P.C.

(57) ABSTRACT

A vehicle body structure includes a lower cabin made of a Carbon Fiber Reinforced Plastic (CFRP) material, an upper body made of a steel material and connected to the lower cabin, and a rear body made of an aluminum material and connected to rear sides of the lower cabin and the upper body.

16 Claims, 6 Drawing Sheets

(56) References Cited

U.S. PATENT DOCUMENTS

2013/0076069 A1* 3/2013 Fuchs .................... B62D 65/02
296/35.1
2013/0214558 A1* 8/2013 Lohmann ............... B62D 21/15
296/187.08
2016/0251038 A1* 9/2016 Kawata .................. B62D 29/04
296/190.08
2017/0253274 A1* 9/2017 Kawata .............. B62D 25/2045
2021/0031837 A1* 2/2021 Schmidt ............... B62D 25/085
2021/0253172 A1* 8/2021 Shimoda .............. B62D 21/152
2023/0399059 A1* 12/2023 Lee ...................... B62D 21/155
2024/0059232 A1* 2/2024 Park ....................... B62D 29/04
2024/0208573 A1* 6/2024 Satoi ...................... B62D 25/08

FOREIGN PATENT DOCUMENTS

CN 120057114 A * 5/2025 ............. B62D 25/16
EP 4699905 A1 * 2/2026 ............. B60R 19/34
KR 102934936 B1 * 3/2026 ........... B62D 27/065
WO WO-2011128081 A1 * 10/2011 ........... B62D 29/046

* cited by examiner

VEHICLE BODY STRUCTURE

CROSS-REFERENCE TO RELATED APPLICATION

This application claims priority to and the benefit of Korean Patent Application No. 10-2022-0101957, filed in the Korean Intellectual Property Office, on Aug. 16, 2022, the entire contents of which are incorporated herein by reference.

TECHNICAL FIELD

The present disclosure relates to a vehicle body structures. More to particularly, the present disclosure relates to a vehicle body structure comprising a cabin of a Carbon Fiber Reinforced Plastic (CFRP) material.

BACKGROUND

Carbon Fiber Reinforced Plastic (CFRP) is a composite material that uses carbon fiber as a reinforcing material and a thermosetting resin or thermoplastic resin as a matrix.

Because CFRP is relatively light and has high strength, its use in car body manufacturing is increasing.

In some cases, CFRP material may be relatively expensive, so its application may be limited.

SUMMARY

The present disclosure has been made in an effort to provide a vehicle body structure comprising a cabin of CFRP material.

A vehicle body structure according to an exemplary implementation of the present disclosure may include a lower cabin made of CFRP material, an upper body made of steel material and connected with the lower cabin, and a rear body made of aluminum material and connected to the rear of the lower cabin and the upper body.

The rear body may include a central support member connected to the rear connection portion of the lower cabin and the upper body, and an upper body support member connected to the upper rear portion of the upper body.

The vehicle body structure according to an exemplary implementation of the present disclosure may further include a central support bracket, which is mounted on the rear connection portion of the lower cabin and the upper body and connected with the central support member, and an upper body support bracket mounted on the rear upper portion of the upper body and connected with the upper body support member.

The central support bracket may include a central bolting flange bolted to the rear connection portion of the lower cabin and the upper body, and a central connecting flange formed protrude to surround and support the side of the central support member, and the upper body support bracket may include an upper bolting flange connected to the upper rear portion of the upper body by bolting, and an upper connecting flange protruded to surround and support a side surface of the upper body support member.

The central connecting flange and the upper connecting flange may have different formation directions.

The central support member and the central connecting flange may be weld connected, and the upper body support member and the upper connecting flange may be weld connected.

The central bolting flange and the upper bolting flange may be bolted from the rear direction of the vehicle body.

The rear body may include a rear side member housing connected to the lower portion of the lower cabin, and a rear side member connected to the rear side member housing.

The rear side member housing may be formed of a material with increased strength than the rear side member.

The rear side member housing may include a lower cabin connecting flange formed to be bolted with the lower cabin from the rear direction of the vehicle body.

The rear body may further include a housing upper support member mounted on the rear side member housing, and the central support member, the upper body support member and the housing upper support member may be connected to form a combined support unit.

The rear side member housing may include a rear side upper connecting flange connected to the housing upper support member.

The rear body may further include a housing slope support member adjacent to the rear side member and connecting the rear side member housing and the combined support unit.

The rear body may further include a cabin support member connecting the combined support unit and the lower cabin.

The rear body may further include a rear side vertical member mounted on the rear side member on both sides, respectively, a rear side cross member connecting the rear side vertical members, and a rear side slope member that connects the combined support unit with the connecting portion of the rear side vertical member and the rear side cross member, respectively.

The vehicle body structure according to an exemplary implementation of the present disclosure may further include a door mounted to the lower cabin, and an upper door impact beam mounted on the door and disposed between a rear connection portion of the lower cabin and the upper body and a front connection portion of the lower cabin and the upper body.

The vehicle body structure according to an exemplary implementation of the present disclosure may further include a lower door impact beam mounted on the door and disposed between the rear connection portion of the lower cabin and the upper body and a connection portion of an A pillar of the lower cabin and a side sill.

According to the vehicle body structure according to an exemplary implementation of the present disclosure, it is possible to suppress the increase in vehicle cost while safely protecting the occupant including the cabin of CFRP material.

In addition, the effects that can be obtained or predicted due to the implementations of the present disclosure will be directly or implicitly disclosed in the detailed description of the implementations of the present disclosure. That is, various effects expected according to an implementation of the present disclosure will be disclosed within the detailed description to be described later.

BRIEF DESCRIPTION OF THE DRAWINGS

Since these drawings are for reference in explaining exemplary implementations of the present disclosure, the technical idea of the present disclosure should not be construed as being limited to the accompanying drawings.

DETAILED DESCRIPTION

Figure 1:
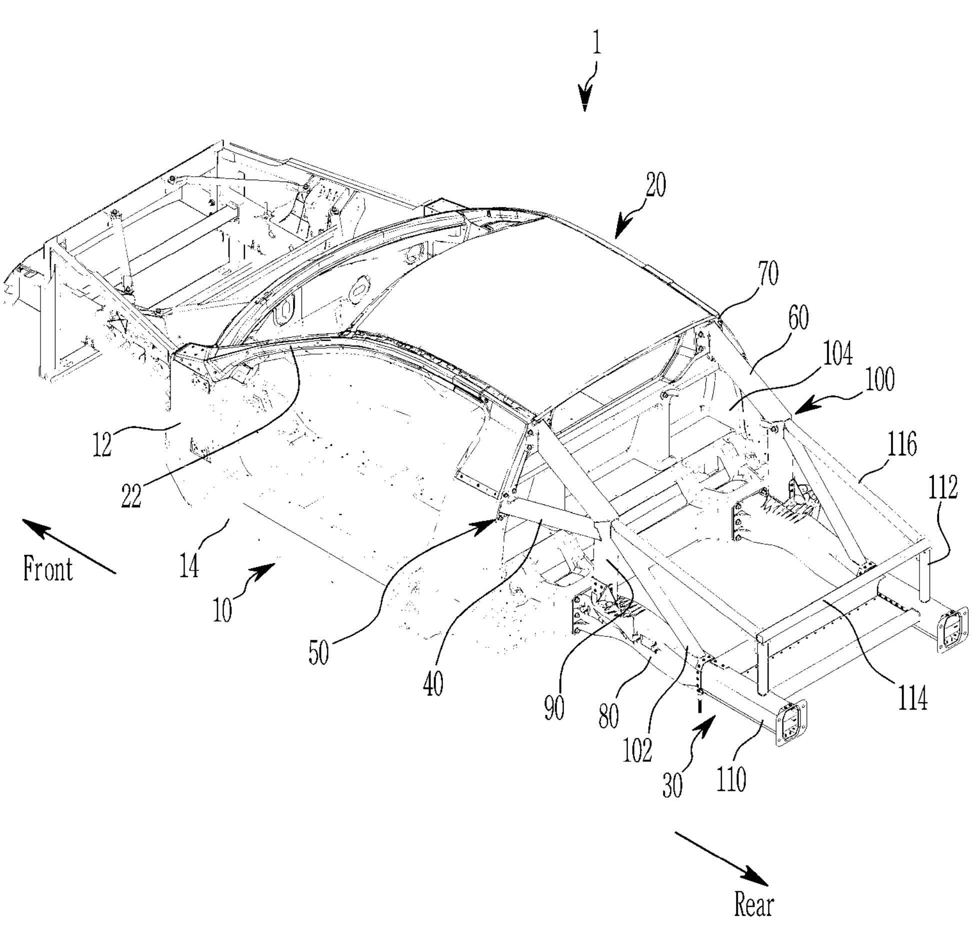
FIG. 1 is a perspective view showing an example of a vehicle body structure.

In this specification, "vehicle," "car," "automotive vehicle" or other similar terms as used herein generally refers to passenger vehicles including sports cars, sport utility vehicles (SUVs), buses, trucks, automobiles including various commercial vehicles (passenger automobiles), including hybrid vehicles, electric vehicles, hybrid electric vehicles, hydrogen-powered vehicles, and other alternative fuel vehicles (e.g., fuels derived from resources other than petroleum).

The present disclosure will be described more fully hereinafter with reference to the accompanying drawings, in which exemplary implementations of the disclosure are shown.

As those skilled in the art would realize, the described implementations may be modified in various different ways, all without departing from the spirit or scope of the present disclosure.

In order to clearly describe the present disclosure, parts irrelevant to the description are omitted, and the same reference numerals are assigned to the same or similar components throughout the specification.

Since the size and thickness of each component shown in the drawings are arbitrarily shown for convenience of description, the present disclosure is not necessarily limited to those shown in the drawings, and the thickness is enlarged to clearly express various parts and regions.

Throughout the specification, when a part includes a certain component, this means that it may further include other components without excluding other components unless otherwise stated.

An exemplary implementation of the present disclosure will hereinafter be described in detail with reference to the accompanying drawings.

FIG. 1 is a perspective view of a vehicle body structure by an exemplary implementation of the present disclosure.

Referring to FIG. 1, a vehicle body 1 to which a vehicle body structure according to an exemplary implementation of the present disclosure may be applied may include a lower cabin 10 made of CFRP material, an upper body 20 made of steel material and connected with the lower cabin 10, and a rear body 30 made of aluminum material and connected to the rear of the lower cabin 10 and the upper body 20.

Since the CFRP material is relatively light and has high strength, it can be applied to the lower cabin 10 to more safely protect passengers.

The upper body 20 is connected to the lower cabin 10, and an economical steel material having relatively strong strength is applied to the upper body 20 so that the occupant may be protected and the cost increase of the vehicle may be suppressed.

The rear body 30 may be applied with an aluminum material that is relatively light and may be partially deformed to provide occupant protection while absorbing the impact of a vehicle collision.

In addition, the rear body 30 is connected with the upper body 20 and the lower cabin 10 of different materials to increase the connection strength of the rear body 30, the upper body 20 and the lower cabin 10, and it is possible to distribute the impact load in the event of a vehicle collision.

Figure 2:
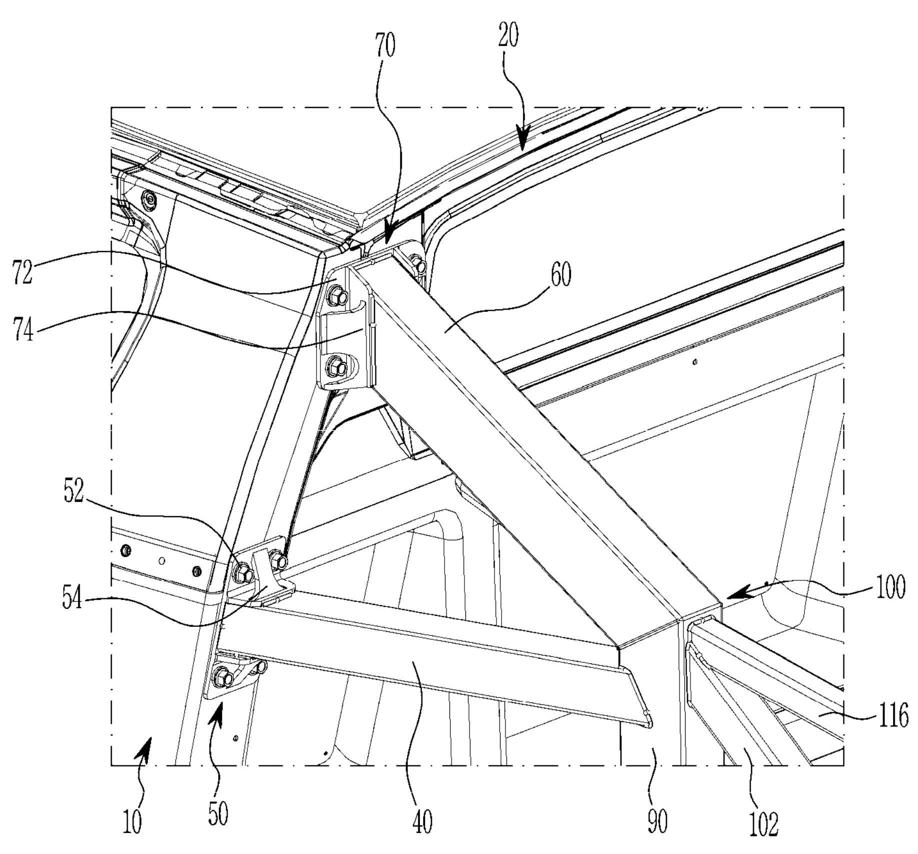
FIG. 2 is a perspective view showing examples of an upper body support member and an upper body of the vehicle body structure.
Figure 3:
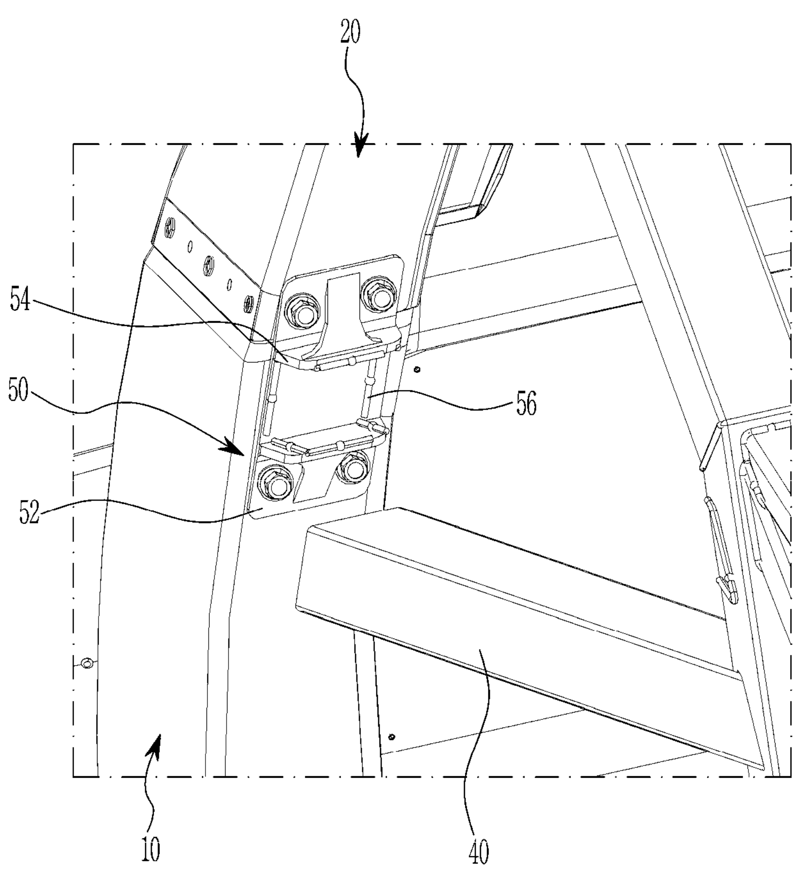
FIG. 3 and FIG. 4 are partially exploded perspective views showing examples of a lower cabin and a central support member of the vehicle body structure.
Figure 4:
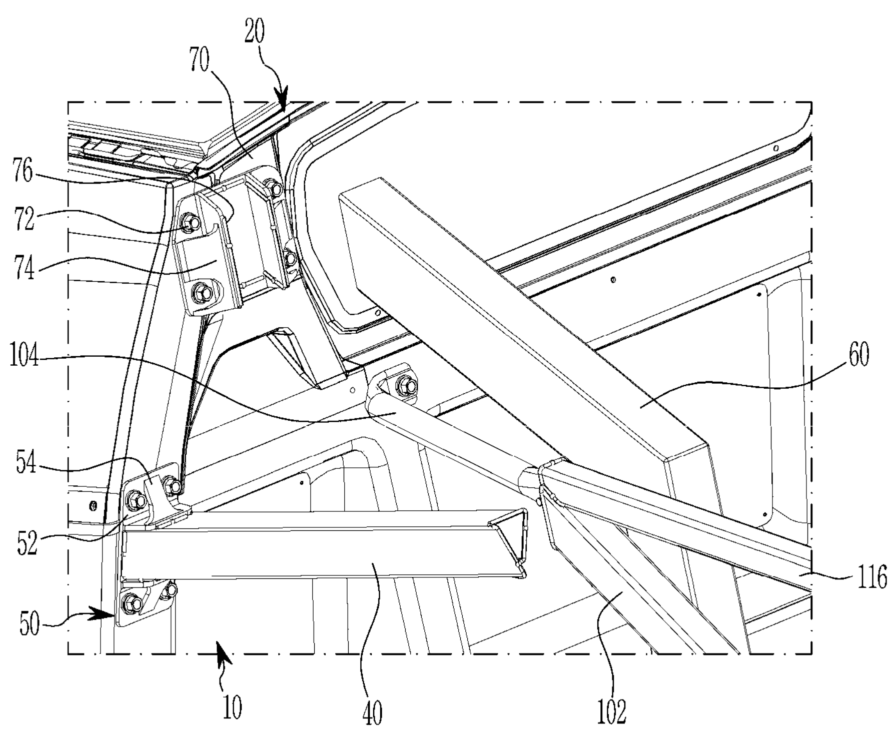
Figure 5:
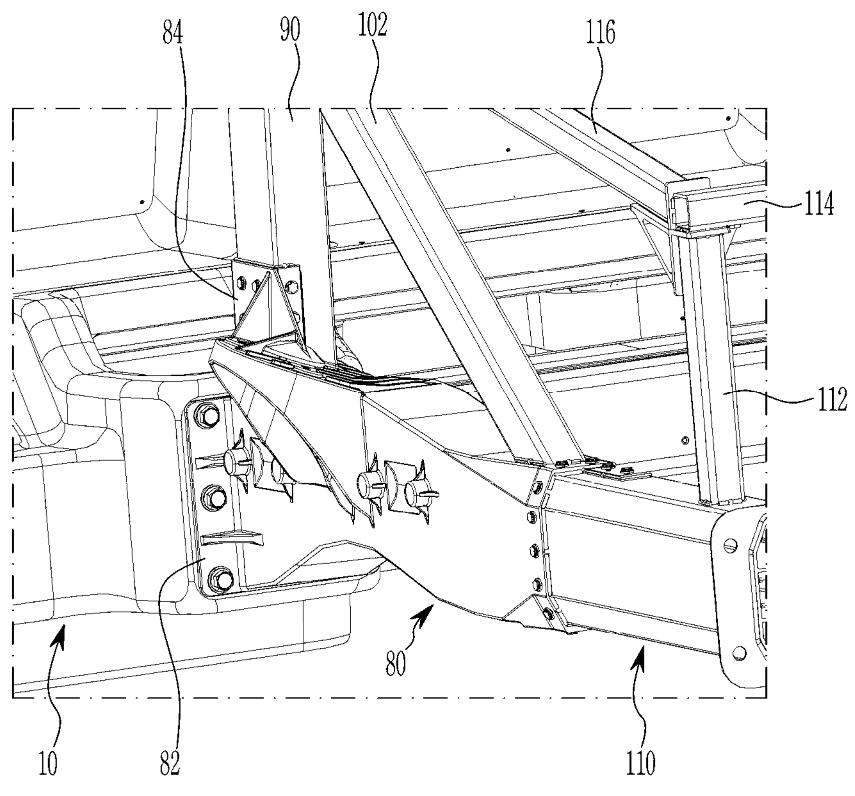
FIG. 5 is a perspective view showing examples of a lower cabin and a rear side member housing of the vehicle body structure.

FIG. 2 is a perspective view showing an upper body support member and an upper body that may be applied to a vehicle body structure according to an exemplary implementation of the present disclosure, and FIG. 3 and FIG. 4 are partially exploded perspective views showing a lower cabin and a central support member that may be applied to a vehicle body structure according to an exemplary implementation of the present disclosure.

Referring to FIG. 1 to FIG. 4, the rear body 30 may include a central support member 40 connected to the rear connection portion of the lower cabin 10 and the upper body 20, and an upper body support member 60 connected to the upper rear portion of the upper body 20.

The vehicle body structure according to an exemplary implementation of the present disclosure may further include a central support bracket 50, which is mounted on the rear connection portion of the lower cabin 10 and the upper body 20 and connected with the central support member 40, and an upper body support bracket 70 mounted on the rear upper portion of the upper body 20 and connected with the upper body support member 60.

The central support bracket 50 is mounted on the rear connection portion of the lower cabin 10 and the upper body 20 to increase connection strength between the lower cabin 10 and the upper body 20.

The central support bracket 50 may include a central bolting flange 52 bolted to the rear connection portion of the lower cabin 10 and the upper body 20, and a central connecting flange 54 formed to protrude to surround and support the side of the central support member 40.

Through the central bolting flange 52, the central support bracket 50 may be bolted to the rear connection portion of the lower cabin 10 and the upper body 20.

In other words, the central support bracket 50 may improve productivity by bolting the lower cabin 10 and the upper body 20 of different materials.

The upper body support bracket 70 may include an upper bolting flange 72 connected to the upper rear portion of the upper body 20 by bolting, and an upper connecting flange 74 protruded to surround and support a side surface of the upper body support member 60.

Through the upper bolting flange 72, the upper body support bracket 70 may be bolted to the rear upper portion of the upper body 20.

Even though the materials of the upper body support bracket 70 and the upper body 20 are different, productivity may be improved through bolting.

The central connecting flange 54 and the upper connecting flange 74 may have different formation directions.

As shown in FIG. 3 and FIG. 4, the central connecting flange 54 may be formed along the width direction of the vehicle body 1, and the upper connecting flange 74 may be formed along the height direction of the vehicle body 1. Through this, it is possible to suppress separation of the central support member 40 and the upper body support member 60 from the central support bracket 50 and the upper body support bracket 70 when a vehicle collides.

However, the formation direction is not limited to that shown in the drawing, and it is possible to be formed in the opposite direction.

In addition, the impact load transmitted from the central support member 40 and the upper body support member 60 is transmitted through the central support bracket 50 and the upper body support bracket 70, which have a relatively wide cross-section, so that the impact load may be properly distributed.

The central bolting flange 52 and the upper bolting flange 72 may be bolted from the rear direction of the vehicle body.

That is, as shown in FIG. 2 to FIG. 4, the central bolting flange 52 and the upper bolting flange 72 are disposed at the rear of the vehicle body so that bolting work may be done at the rear of the vehicle body 1, improving the productivity of the vehicle.

The central support member 40 and the central connecting flange 54 may be weld connected, and the upper body support member 60 and the upper connecting flange 74 may be weld connected.

That is, the central support bracket 50 may be formed of a metal material, for example, an aluminum material.

In addition, the central support member 40 is connected to the central connecting flange 54. For example, a central connecting flange welding portion 56 may be formed along the circumference of the central connecting flange 54 to connect the central support member 40.

Also, the upper body support bracket 70 may be formed of a metal material, for example, an aluminum material.

In addition, the upper body support member 60 is connected to the upper connecting flange 74. For example, an upper connecting flange welding portion 76 may be formed along the circumference of the upper connecting flange 74 to connect the upper body support member 60.

The rear body 30 may further include a rear side member housing 80 connected to the lower portion of the lower cabin 10, and a rear side member 110 connected to the rear side member housing 80.

The rear side member housing 80 may be formed of a material with increased strength than the rear side member 110.

Therefore, in the case of a rear collision of a vehicle, the impact load transmitted to the rear side member 110 is absorbed while the rear side member 110 is deformed before being transmitted to the lower cabin 10 and the upper body 20, thereby reducing injury to the occupant.

Figure 6:
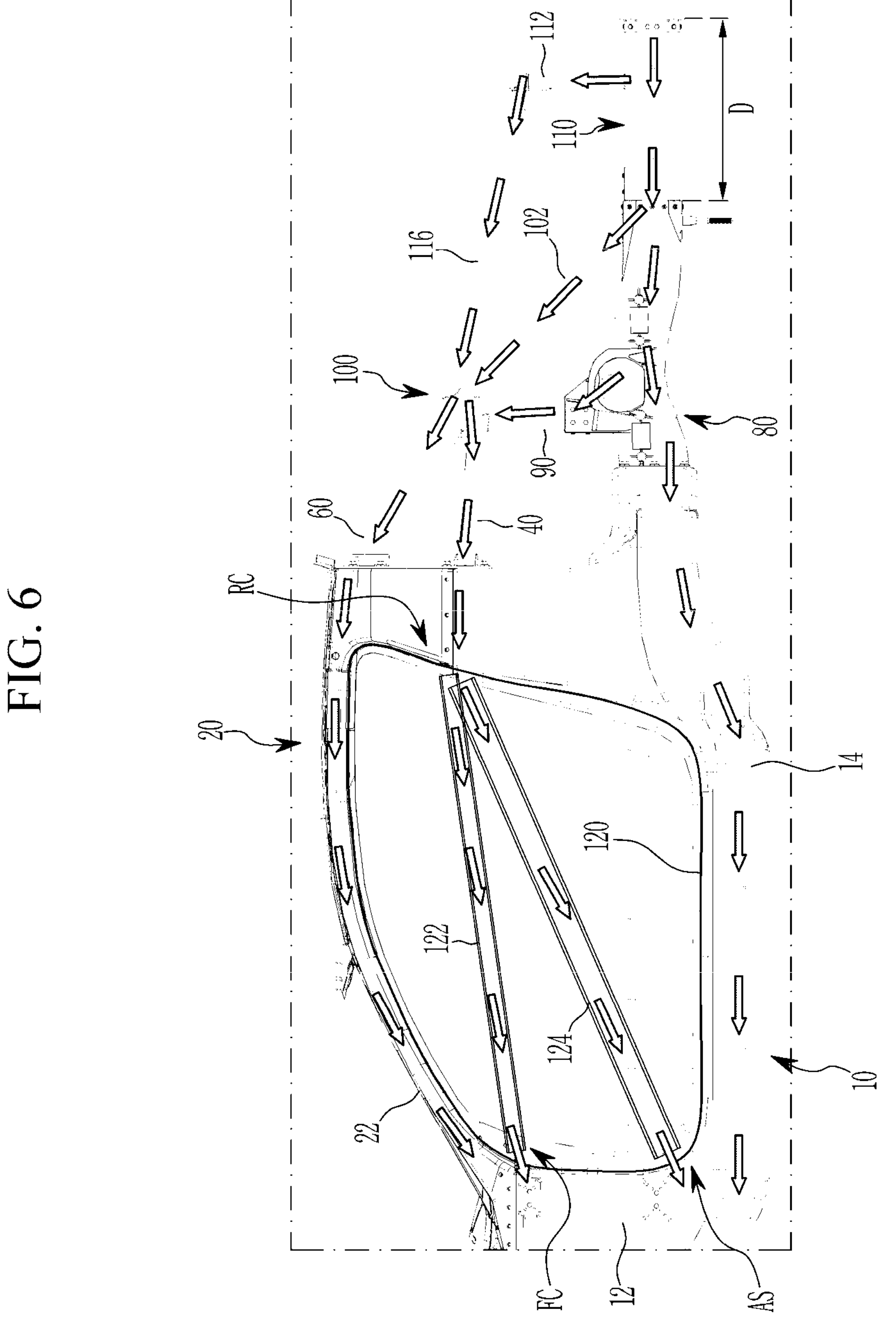
FIG. 6 is a partial side view of an example of a vehicle body structure.

As shown in FIG. 6, the rear side member 110 is formed of, for example, an aluminum material, and may absorb impact by forming a deformation space D when a vehicle collides.

The rear side member housing 80 may include a lower cabin connecting flange 82 formed to be bolted with the lower cabin 10 from the rear direction of the vehicle body.

Like the central bolting flange 52 and the upper bolting flange 72, the lower cabin connecting flange 82 is also disposed in the rear direction of the vehicle body so that bolting work may be done from the rear of the vehicle body 1, improving the productivity of the vehicle.

The rear body 30 further includes a housing upper support member 90 mounted on the rear side member housing 80.

The central support member 40, the upper body support member 60 and the housing upper support member 90 may be connected to form a combined support unit 100.

The connection of the central support member 40, the upper body support member 60 and the housing upper support member 90 strengthens the connection force with the lower cabin 10 and the upper body 20, and thus in the case of a rear collision of the vehicle, the impact is distributed to the lower cabin and the upper body 20 to reduce occupant injuries.

The rear side member housing 80 may include a rear side upper connecting flange 84 connected to the housing upper support member 90.

The rear side upper connecting flange 84 connects the rear side member housing 80 and the housing upper support member 90 to increase connection strength and improve productivity.

FIG. 6 is a partial side view of a vehicle body structure according to an exemplary implementation of the present disclosure.

Referring to FIG. 1 to FIG. 6, the rear body 30 may further include a housing slope support member 102 adjacent to the rear side member 110 and connecting the rear side member housing 80 and the combined support unit 100.

The housing slope support member 102 may reduce injuries to the occupant by distributing the crash load transmitted from the rear of the vehicle to the lower cabin 10 and the upper body 20 through the combined support unit 100 when the vehicle collides.

The rear body 30 may further include a cabin support member 104 connecting the combined support unit 100 and the lower cabin 10.

The rear body 30 may reduce the impact load by distributing the impact load transmitted through the combined support unit 100 to the lower cabin 10 together with the central support member 40 when the vehicle collides.

The rear body 30 may further include a rear side vertical member 112 mounted on the rear side member 110 on both sides, respectively, a rear side cross member 114 connecting the rear side vertical members 112, and a rear side slope member 116 that connects the combined support unit 100 with the connecting portion of the rear side vertical member 112 and the rear side cross member 114, respectively.

The rear side vertical member 112, the rear side cross member 114, and the rear side slope member 116 form the skeleton of the vehicle body 1 and support the rear side member 110 to improve vehicle performance and reduce NVH (noise, vibration, and harshness).

In addition, the rear side vertical member 112, the rear side cross member 114, and the rear side slope member 116 transfer part of the impact load transmitted from the rear side member 110 to the lower cabin 10 and the upper body 20 through the combined support unit 100 so that injury to the occupant may be reduced.

The vehicle body structure according to an exemplary implementation of the present disclosure may further include a door 120 mounted to the lower cabin 10 and an upper door impact beam 122 mounted on the door 120 and disposed between a rear connection portion RC of the lower cabin 10 and the upper body 20 and a front connection portion FC of the lower cabin 10 and the upper body 20.

The upper door impact beam 122 may prevent injury to the occupant in case of a side collision of the vehicle, and in the case of a rear collision of the vehicle, the crash load transmitted to the rear connection portion RC of the lower cabin 10 and the upper body 20 through the combined support unit 100 is distributed to the front of the vehicle body 1 through the front connection portion FC of the lower cabin 10 and the upper body 20.

The vehicle body structure according to an exemplary implementation of the present disclosure may further include a lower door impact beam 124 mounted on the door 120 and disposed between the rear connection portion RC of the lower cabin 10 and the upper body 20 and a connection portion AS of an A pillar 12 of the lower cabin 10 and a side sill 14.

The lower door impact beam 124 may prevent injury to the occupant in case of a side collision of the vehicle, and in the case of a rear collision of the vehicle, the crash load transmitted to the rear connection portion RC of the lower cabin 10 and the upper body 20 through the combined support unit 100 is distributed to the front of the vehicle body 1 through the connection portion AS of the A pillar 12 and the side sill 14.

As described above, in the vehicle body structure according to an exemplary implementation of the present disclosure, by combining the lower cabin 10 of CFRP material, the upper body 20 of the steel material, and the rear body 30 of the aluminum material, the vehicle strength may be maintained while being light.

This structure may reduce the weight of the vehicle while maintaining the strength of a vehicle having a relatively large weight, such as an electric vehicle (EV) or a fuel cell electric vehicle (FCEV).

In addition, the vehicle body structure according to an exemplary implementation of the present disclosure may reduce injury to passengers by transmitting a collision load through a plurality of load paths when a vehicle collides.

That is, when a vehicle collides, a part of the impact load of the rear side member 110 may be distributed to the front of the vehicle body 1 through the rear side member housing 80 and the lower cabin 10.

In addition, part of the impact load is transmitted to the combined support unit 100 through the housing slope support member 102, the rear side slope member 116 and the housing upper support member 90, and the impact load may be distributed through the central support member 40, the upper body support member 60 and the cabin support member 104 and transferred to the lower cabin 10 and the upper body 20.

Through this, the vehicle body structure according to an exemplary implementation of the present disclosure may absorb the impact and reduce the injury of the passengers.

In addition, the strength of the vehicle body 1 is increased through the combined structure of the lower cabin 10, the upper body 20 and the rear body 30, enabling drivability and NVH performance improvement.

While this disclosure has been described in connection with what is presently considered to be practical exemplary implementations, it is to be understood that the disclosure is not limited to the disclosed implementations. It is intended to cover various modifications and equivalent arrangements included within the spirit and scope of the appended claims.

What is claimed is:

1. A vehicle body structure comprising:

a lower cabin made of a Carbon Fiber Reinforced Plastic (CFRP) material;

an upper body made of a steel material and connected to the lower cabin; and a rear body made of an aluminum material and connected to rear sides of the lower cabin and the upper body, wherein the rear body comprises:

a central support member connected to a rear connection portion of the lower cabin that is connected to the rear side of the upper body, and an upper body support member connected to an upper rear portion of the upper body, wherein the vehicle body structure further comprises:

a central support bracket disposed at the rear connection portion and connected to the central support member, and an upper body support bracket disposed at the upper rear portion of the upper body and connected to the upper body support member, wherein the central support bracket comprises a central connecting flange that protrudes toward the central support member and supports a side surface of the central support member, wherein the upper body support bracket comprises an upper connecting flange that protrudes toward the upper body support member and supports a side surface of the upper body support member, and wherein one of the central connecting flange and the upper connecting flange is formed along a width direction of the vehicle body structure, while the other of the central connecting flange and the upper connecting flange is formed along a height direction of the vehicle body structure.

2. The vehicle body structure of claim 1, wherein the central support bracket further comprises a central bolting flange coupled to the rear connection portion, and wherein the upper body support bracket further comprises an upper bolting flange connected to the upper rear portion of the upper body by one or more bolts.

3. The vehicle body structure of claim 1, wherein:

the central support member and the central connecting flange include a weld connection portion; and the upper body support member and the upper connecting flange include a weld connection portion.

4. The vehicle body structure of claim 2, wherein the central bolting flange and the upper bolting flange are bolted from a rear side of the vehicle body structure.

5. The vehicle body structure of claim 1, wherein the rear body comprises:

a rear side member housing connected to a lower portion of the lower cabin; and a rear side member connected to the rear side member housing.

6. The vehicle body structure of claim 5, wherein a material strength of the rear side member housing is greater than a material strength of the rear side member.

7. The vehicle body structure of claim 5, wherein the rear side member housing comprises:

a lower cabin connecting flange that is bolted to the lower cabin from a rear side of the vehicle body structure.

8. The vehicle body structure of claim 5, wherein the rear body further comprises a housing upper support member disposed at the rear side member housing, and wherein the central support member, the upper body support member, and the housing upper support member are connected to one another to thereby define a combined support unit.

9. The vehicle body structure of claim 8, wherein the rear side member housing comprises a rear side upper connecting flange connected to the housing upper support member.

10. The vehicle body structure of claim 8, wherein the rear body further comprises a housing slope support member that is disposed adjacent to the rear side member and connects the rear side member housing to the combined support unit.

11. The vehicle body structure of claim 8, wherein the rear body further comprises a cabin support member that connects the combined support unit to the lower cabin.

12. The vehicle body structure of claim 8, wherein the rear body further comprises:

rear side vertical members disposed at sides of the rear side member, respectively;

a rear side cross member that connects the rear side vertical members to each other; and rear side slope members, each of the rear side slope members connecting the combined support unit to a connecting portion between the rear side cross member and one of the rear side vertical members.

13. The vehicle body structure of claim 1, further comprising:

a door coupled to the lower cabin; and an upper door impact beam disposed at the door, the upper door impact beam being disposed between the rear connection portion of the lower cabin and a front connection portion of the lower cabin, the front connection portion being connected to a front side of the upper body.

14. The vehicle body structure of claim 13, further comprising:

an A pillar disposed at the lower cabin;

a side sill connected to the A pillar; and a lower door impact beam disposed at the door, the lower door impact beam being disposed between the rear connection portion of the lower cabin and a connection portion of the A pillar, the connection portion of the A pillar being connected to the side sill.

15. The vehicle body structure of claim 1, wherein the central connecting flange is formed along the width direction, and the upper connecting flange is formed along the height direction.

16. A vehicle body structure comprising:

a lower cabin made of a Carbon Fiber Reinforced Plastic (CFRP) material;

an upper body made of a steel material and connected to the lower cabin; and a rear body made of an aluminum material and connected to rear sides of the lower cabin and the upper body, wherein the rear body comprises:

a central support member connected to a rear connection portion of the lower cabin that is connected to the rear side of the upper body, and an upper body support member connected to an upper rear portion of the upper body, wherein the rear body comprises:

a rear side member housing connected to a lower portion of the lower cabin, and a rear side member connected to the rear side member housing, wherein the rear body further comprises a housing upper support member disposed at the rear side member housing, wherein the central support member, the upper body support member, and the housing upper support member are connected to one another to thereby define a combined support unit, and wherein the rear side member housing comprises a rear side upper connecting flange connected to the housing upper support member.

* * * * *